United States Patent
Kiernan et al.

(10) Patent No.: US 6,721,730 B2
(45) Date of Patent: Apr. 13, 2004

(54) LEFT OUTER JOIN ELIMINATION ON KEY

(75) Inventors: Gerald George Kiernan, San Jose, CA (US); Jayavel Shanmugasundaram, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 09/887,582

(22) Filed: Jun. 21, 2001

(65) Prior Publication Data

US 2003/0009450 A1 Jan. 9, 2003

(51) Int. Cl.$^7$ ................................................ G06F 17/30
(52) U.S. Cl. ................................................. 707/3; 707/4
(58) Field of Search ............................... 707/1, 2, 3, 4, 707/5, 6, 7, 8

(56) References Cited

U.S. PATENT DOCUMENTS

| | | | |
|---|---|---|---|
| 5,412,804 A | 5/1995 | Krishna | 707/2 |
| 5,701,454 A | 12/1997 | Bhargava et al. | 707/2 |
| 5,774,692 A | 6/1998 | Boyer et al. | 707/3 |
| 5,797,136 A | 8/1998 | Boyer et al. | 707/2 |
| 5,822,750 A * | 10/1998 | Jou et al. | 707/2 |
| 5,864,847 A | 1/1999 | Goel et al. | 707/4 |
| 5,875,447 A | 2/1999 | Goel et al. | 707/4 |
| 5,890,148 A | 3/1999 | Bhargava et al. | 707/2 |
| 5,960,427 A | 9/1999 | Goel et al. | 707/4 |
| 5,963,933 A | 10/1999 | Cheng et al. | 707/2 |
| 6,088,691 A | 7/2000 | Bhargava et al. | 707/2 |
| 6,253,197 B1 * | 6/2001 | Lindsay et al. | 707/3 |
| 6,385,603 B1 * | 5/2002 | Chen et al. | 707/3 |

OTHER PUBLICATIONS

M.M. David, 1999, "SQL–Based XML Structured Data Access," Web Techniques, pp. 6 and 6 figures.

* cited by examiner

*Primary Examiner*—Diane D. Mizrahi
*Assistant Examiner*—Yicun Wu
(74) *Attorney, Agent, or Firm*—Gates & Cooper LLP

(57) ABSTRACT

A query optimization technique that determines whether any column from a right quantifier of a left outer join query is projected out of the query. If not, then all predicates in an ON clause are removed from the left outer join query, the right quantifier is removed from the left outer join query, and the left outer join query is converted to a simple select query. A number of steps are performed to determine whether any of the columns quantified by the right quantifier participate in a projection list of the query. A set of equivalence class columns is computed for the query, wherein the equivalence classes are derived from equi-join predicates in the query. A set of columns quantified by the right quantifier across the computed set of equivalence classes is computed. A determination is made whether a subset of the set of columns form a key for the right quantifier. If the right quantifier columns are not projected out of the query, then the optimization may be performed.

6 Claims, 3 Drawing Sheets

LEFT OUTER JOIN ELIMINATION ON KEY

BACKGROUND OF THE INVENTION

1. Field of the Invention

This invention relates in general to database management systems performed by computers, and in particular, to the optimization of queries that include left outer joins.

2. Description of Related Art

Since its introduction, XML, the eXtended Markup Language, has quickly emerged as a universal format for publishing and exchanging data over the World Wide Web. However, problems still exist in publishing data from relational databases as XML documents.

In the business-to-business e-commerce area, there is a widely recognized need to create XML documents by combining one or more relational tables, e.g., by creating an XML purchase order by joining a customer with information drawn from other tables. A relational join is a well-known operation that combines information from two base tables by creating pairs of matching rows.

Inner joins discard rows without any matches, while outer joins preserve all information from one or both of its arguments. Outer joins can be further categorized into left, right (single-sided), or full (two-sided) outerjoin, depending on which side needs to be preserved.

Outer joins are especially useful for exporting data from relational databases to XML documents. However, there are performance costs associated with performing such outer joins. Thus, there is a need in the art for improved techniques of performing outer joins, and especially for optimization methods for outer joins.

SUMMARY OF THE INVENTION

To overcome the limitations in the prior art described above, and to overcome other limitations that will become apparent upon reading and understanding the present specification, the present invention discloses a method, apparatus, and article of manufacture for optimizing left outer join queries. A determination is made whether any column from a right quantifier of a left outer join query is projected out of the query. If not, then all predicates in an ON clause are removed from the left outer join query, the right quantifier is removed from the left outer join query, and the left outer join query is converted to a simple select query.

A number of steps are performed to determine whether any of the columns quantified by the right quantifier participate in a projection list of the query. A set of equivalence class columns is computed for the query, wherein the equivalence classes are derived from equi-join predicates in the query. A set of columns quantified by the right quantifier across the computed set of equivalence classes is computed. A determination is made whether a subset of the set of columns form a key for the right quantifier. If the right quantifier columns are not projected out of the query, then the optimization may be performed.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

An XML middleware system presents relational databases as XML repositories. Queries against the XML representation of the databases are expressed in X-Query statements, which is a query language developed to query XML documents. The XML middleware system may optimize the X-Query statements using an optimization known as Left Outer Join Elimination on Key. The XML middleware system translates the optimized X-Query statements into SQL queries that can be executed by a relational database management system (RDBMS). When the query results are returned by the RDBMS, the XML middleware system renders the query results as one or more XML documents.

Hardware and Software Environment

Figure 1:
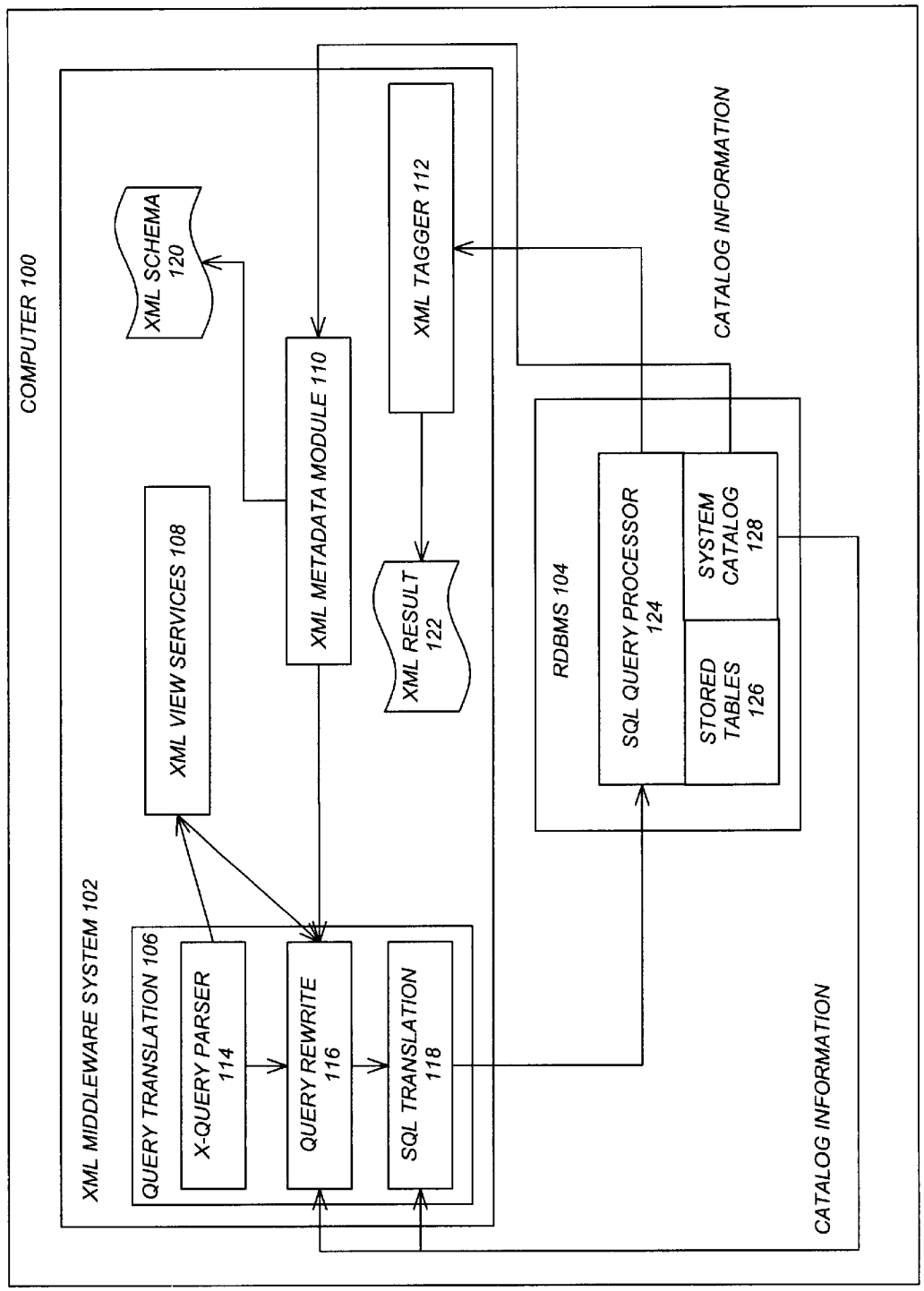
FIG. 1 illustrates the computer hardware environment of the present invention.

FIG. 1 illustrates an exemplary hardware and software environment that could be used with the preferred embodiment of the present invention. In the exemplary environment, a computer 100 executes an XML (eXtended Markup Language) middleware system 102 that interfaces to a relational database management system (RDBMS) 104 that manages one or more databases.

In the preferred embodiment of the present invention, the XML middleware system 102 and the RDBMS 104 may be executed on the same computer 100 or different computers 100. Moreover, the computer 100 may comprise a server on a network, such as the Internet, wherein the computer 100 is accessed by one or more client computers connected to the network. Those skilled in the art will recognize that the present invention can be used in any number of different hardware and software environments.

Also, in the preferred embodiment of the present invention, the XML middleware system 102 comprises the XPERANTO (Xml Publishing of Entities, Relationships, ANd Typed Objects) system offered by IBM Corporation, and the RDBMS comprises the DataBase 2 (DB2™) Universal DataBase (UDB™) product offered by IBM Corporation. Again, those skilled in the art will recognize that the present invention has application to any XML middleware system and any DBMS, and may be implemented in many different types and brands of such systems.

Generally, the XML middleware system 102 and the RDBMS 104 each comprises logic and/or data that is embodied in or retrievable from a device, medium, signal or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, medium, signal or carrier.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

Operation of the XML Middleware System and RDBMS

The XML middleware system 102 provides a default XML view of existing relational databases managed by the RDBMS 104 and an XML query facility with which users can define new XML views. These views can also be queried using the same XML query facility, without the users having to learn or write SQL. The XML middleware system 102 translates XML queries into SQL queries, submits the SQL queries to the RDBMS 104 for execution, receives the results from the RDBMS 104, and then translates these results into XML documents.

As shown in FIG. 1, the XML middleware system 102 is organized into four components: Query Translation 106, XML View Services 108, XML Metadata Module 110, and XML Tagger 112. The Query Translation component 106 is organized into three sub-components: X-Query Parser 114, Query Rewrite 116, and SQL Translation 1118. The functions performed by each of the components and sub-components are described below.

- Query Translation 106: Translates the XML query language (X-Query) an appropriate dialect of SQL for the RDBMS 104. This function is further sub-divided among the sub-components of Query Translation 106:
  - X-Query Parser 114: Takes X-Query statements and generates an XQGM (XML Query Graph Model), which is a language-neutral intermediate representation for the X-Query statements.
  - Query Rewrite 116: Optimizes the XQGM, resolves view references, performs XML view composition, and produces a semantically equivalent representation of the XQGM.
  - SQL Translation 118: Translates the XQGM to SQL statements for use by the RDBMS 104.
- XML View Services 108: Serves as a storage and retrieval interface for X-Query view definitions. When views are defined, they are stored in a dedicated table. They can be later retrieved for view unfolding.
- XML Metadata Module 110: Takes catalog information and produces XML schema information 120 for XML views and query results.
- XML Tagger 112: Converts SQL query results into XML results 122, which typically comprise structured XML documents.

As shown in FIG. 1, the RDBMS 104 is organized into three components: SQL Query Processor 124, Stored Tables 126, and System Catalog 128. The functions performed by each of the components is described below.

- SQL Query Processor 124: Processes and executes the SQL query received from Query Translation 106 and provides the results from that execution to the XML Tagger 112.
- Stored Tables 126: The data stored in the relational database.
- System Catalog 128: Meta-data concerning the Stored Tables 126.

Query Optimization and Execution

Figure 2:
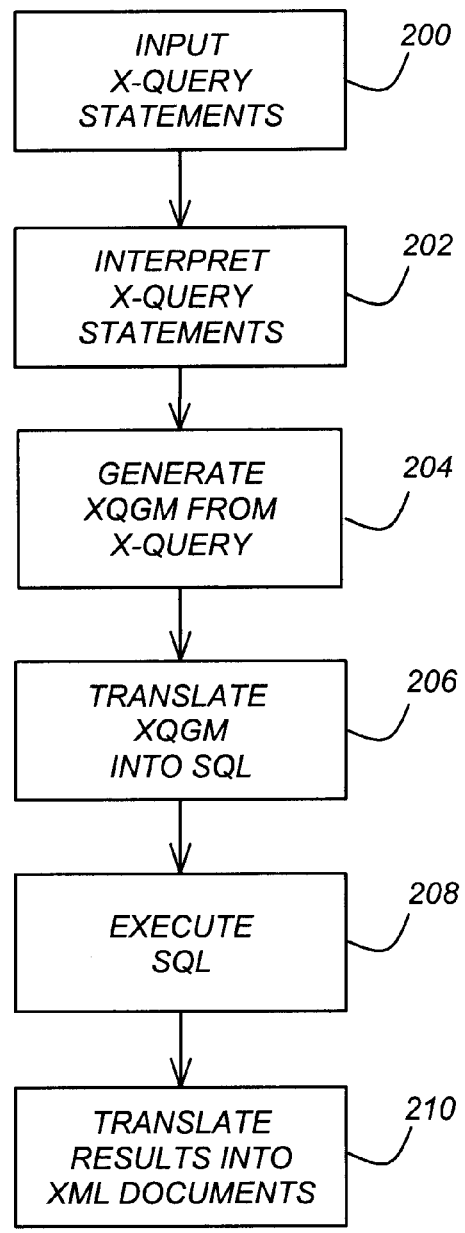
FIG. 2 is a flowchart illustrating the steps necessary for the optimization and execution of SQL statements according to the preferred embodiment of the present invention.

FIG. 2 is a flowchart illustrating the steps necessary for the optimization and execution of X-Query statements according to the preferred embodiment of the present invention. Block 200 represents the input of X-Query statements into the XML middleware system 102. Block 202 represents the XML middleware system 102 interpreting the X-Query statements. Block 204 represents the XML middleware system 102 generating the XQGM runtime structures from the X-Query statements.

An optimization function at Block 204 may transform or optimize the X-Query statements in a manner described in more detail later in this specification. Generally, the X-Query statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query.

Block 206 represents the XML middleware system 102 translating the XQGM into SQL statements and providing those SQL statements to the RDBMS 104 for execution. Block 208 represents the RDBMS 104 executing the SQL statements and providing the results therefrom back to the XML middleware system 102. Block 210 represents the XML middleware system 102 translating the results received from the RDBMS 104 into XML documents.

Description of the Optimization Technique

The present invention discloses an improved optimization technique that is typically performed at step 204 of FIG. 2. Query rewrite optimizations may be performed by the XML middleware system 102 to optimize a query's performance. The present invention focuses on one such optimization known as Left Outer Join Elimination on Key.

The Left Outer Join Elimination on Key optimization corresponds to a situation that occurs during query processing by the XML middleware system 102 and is illustrated with the following left outer join query:

SELECT E.NAME
FROM EMP E LEFT OUTER JOIN DEPT D
ON E.DID=D.NO

The above query can be rewritten as a simple select query:
SELECT E.NAME FROM EMP E The rule that implements this transformation can be summarized as follows:

If the ON clause of a left outer join query matches distinct values from the right side of a left outer join (e.g., DEPT D), and no column from the right side is projected out of the query, the right quantifier (e.g., DEPT D) of the left outer join can be dropped and the query can be converted into a simple select query.

Converting an outer join query into a simple select (i.e., a query with a single table in the FROM clause) can result in a substantial performance improvement for the query. Furthermore, after the outer join has been eliminated, other optimizations might be applicable to further improve the query's performance.

The main idea of this transformation is that, with respect to the outer join predicate (e.g., E.DID=D.NO), the left quantifier (e.g., EMP E) will match with at most a single row from the table represented by the right quantifier (e.g., DEPT D). In the absence of a match, the values associated with columns quantified by the right quantifier are nulls. Since no column quantified by the right quantifier is projected out, the query's result is indiscriminate with respect to a match or the absence of a match. Therefore, the right quantifier can be eliminated from the query. The query result is hence one row per input tuple of the left quantifier, which is equivalent to a simple select over the left quantifier.

The rule that implements the preferred embodiment of the present invention is comprised of a condition and an action. The condition parts of the rule are tested for each quantifier in the query to determine whether the action parts of the rule are to be performed, and when performed, the action parts of the rule reduce the outer join query to a simple select query.

Condition:
1. A quantifier Q is in a SELECT operator that implements a left outer join.
2. The quantifier Q is a right quantifier in the SELECT operator.
3. None of the columns quantified by Q participate in a projection list of the query.
4. Compute the set of equivalence class columns in the query, wherein the equivalence classes are derived from equi-join predicates in the query. Compute the set of columns quantified by the right quantifier Q across the set of equivalence classes. A subset of these columns form a key.
5. If all of the above condition parts are met, the action parts of the rule are performed; otherwise, the rule fails.

Action:
1. Remove all the predicates in the ON clause of the left outer join query.
2. Remove the right quantifier Q from the left outer join query.
3. Convert the left outer join query into a simple select query.

Logic of the Optimization Technique

Figure 3:
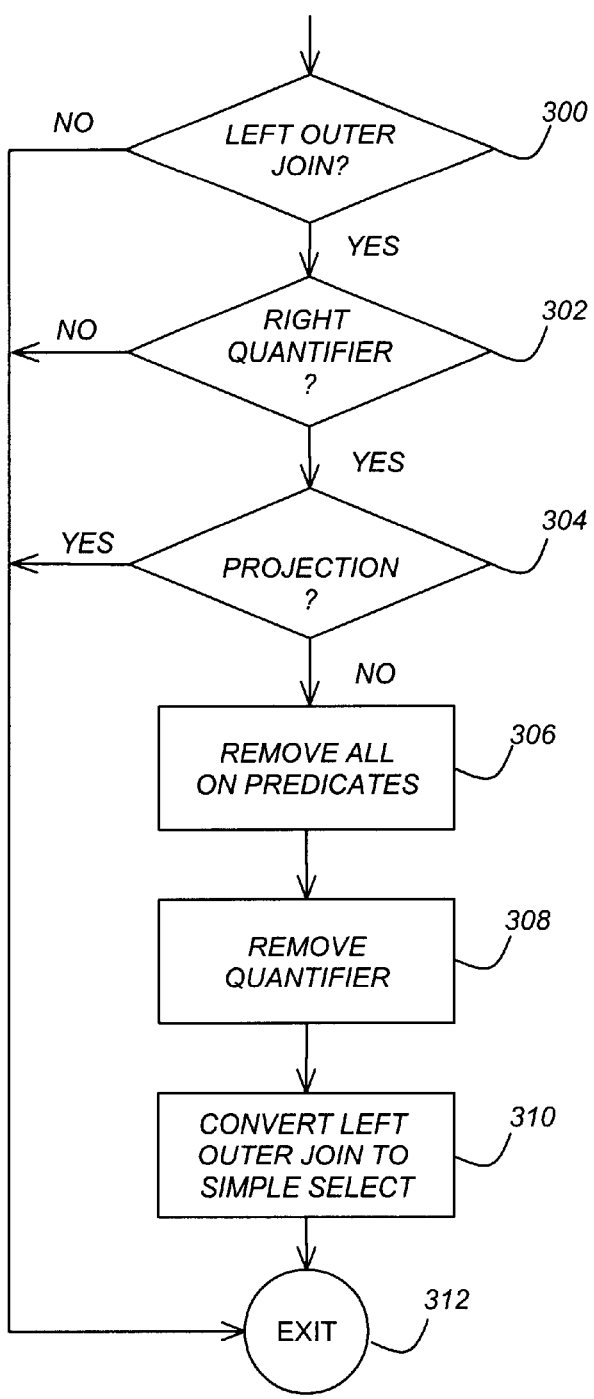
FIG. 3 is a flowchart illustrating the method of optimizing queries in FIG. 2 according to the preferred embodiment of the present invention.

FIG. 3 is a flowchart illustrating the method of optimizing queries in step 202 of FIG. 2 according to the preferred embodiment of the present invention. Specifically, this flowchart further describes the logic of the rule above that implements the preferred embodiment of the present invention.

As noted above, the rule is comprised of a condition and an action. Blocks 300–306 represent the condition parts of the rule, and Blocks 308–310 represent the action parts of the rule. The logic of these different blocks are described in more detail below.

Block 300 represents the XML middleware system 102 determining whether the query includes a quantifier Q in a SELECT operator that implements a left outer join. If not, control transfers to 312 to exit; otherwise, control transfers to Block 302.

Block 302 represents the XML middleware system 102 determining whether the quantifier Q is a right quantifier in the SELECT operator. If not, control transfers to 312 to exit; otherwise, control transfers to Block 304.

Block 304 represents the XML middleware system 102 determining whether any of the columns quantified by the right quantifier Q participate in a projection list of the query. If so, control transfers to 312 to exit; otherwise, control transfers to Block 306.

Within Block 304, the following steps are performed. The XML middleware system 102 computes the set of equivalence class columns in the query, wherein the equivalence classes are derived from equi-join predicates in the query. The XML middleware system 102 computes the set of columns quantified by the right quantifier Q across the set of equivalence classes. Finally, the XML middleware system 102 determines whether a subset of these columns form a key for the right quantifier Q. If not, control transfers to 312 to exit; otherwise, control transfers to Block 306.

If control reaches Block 306, then all of the conditions of the rule have been met, which indicates that the action parts of the rule should be performed.

Block 306 represents the XML middleware system 102 removing all the predicates in the ON clause of the left outer join query.

Block 308 represents the XML middleware system 102 removing the right quantifier Q from the left outer join query.

Block 310 represents the XML middleware system 102 converting the left outer join query into a simple select query.

Finally, control transfers to 312 to terminate the logic.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any XML middleware system and/or database management system could benefit from the present invention.

In summary, the present invention discloses a method, apparatus, and article of manufacture for optimizing left outer join queries. A determination is made whether any column from a right quantifier of a left outer join query is projected out of the query. If not, then all predicates in an ON clause are removed from the left outer join query, the right quantifier is removed from the left outer join query, and the left outer join query is converted to a simple select query.

A number of steps are performed to determine whether any of the columns quantified by the right quantifier participate in a projection list of the query. A set of equivalence class columns is computed for the query, wherein the equivalence classes are derived from equi-join predicates in the query. A set of columns quantified by the right quantifier across the computed set of equivalence classes is computed. A determination is made whether a subset of the set of columns form a key for the right quantifier. If the right quantifier columns are not projected out of the query, then the optimization may be performed.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of performing a query in a computer to retrieve data from a database, comprising:

(a) determining whether any column from a right quantifier of a SELECT operator that implements a left outer join query is projected out of the query; and (b) if not, then removing all predicates in an ON clause of the left outer join query, removing the right quantifier from the left outer join query, and converting the left outer join query to a simple select query.

2. The method of claim 1, wherein the determining step (a) comprises;
   (1) determining whether any of the columns quantified by the right quantifier participate in a projection list of the query, wherein the determining step (1) comprises:
      (i) comparing a set of equivalence class columns for the query, wherein the set of equivalence classes are derived from equi-join predicates in the query;
      (ii) computing a set of columns quantified by the right quantifier across the computed set of equivalence classes; and
      (iii) determining whether a subset of the set of columns form a key for the right quantifier.

3. A computer-implemented apparatus for performing a query, comprising:
   a computer, wherein the query is performed in the computer to retrieve data from a database;
   logic, performed by the computer system, for:
      (a) determining whether any column from a right quantifier of a SELECT operator that implements a left outer join query is projected out of the query; and
      (b) if not, then removing all predicates in an ON clause of the left outer join query, removing the right quantifier from the left outer join query, and converting the left outer join query to a simple select query.

4. The apparatus of claim 3, wherein the logic for determining (a) comprises logic for:
   (1) determining whether any of the columns quantified by the right quantifier participate in a projection list of the query, wherein the logic for determining (1) comprises logic for:
      (i) computing a set of equivalence class columns for the query, wherein the set of equivalence classes are derived from equi-join predicates in the query;
      (ii) computing a set of columns quantified by the right quantifier across the computed set of equivalence classes; and
      (iii) determining whether a subset of the set of columns form a key for the right quantifier.

5. An article of manufacture embodying logic for performing a query in a computer to retrieve data from a database, the logic comprising:
   (a) determining whether any column from a right quantifier of a SELECT operator that implements a left outer join query is projected out of the query; and
   (b) if not, then removing all predicates in an ON clause of the left outer join query, removing the right quantifier from the left outer join query, and converting the left outer join query to a simple select query.

6. The article of manufacture of claim 5, wherein the determining step (a) comprises:
   (1) determining whether any of the columns quantified by the right quantifier participate in a projection list of the query, wherein the determining step (1) comprises:
      (i) computing a set of equivalence class columns for the query, wherein the set of equivalence classes are derived from equi-join predicates in the query;
      (ii) computing a set of columns quantified by the right quantifier across the computed set of equivalence classes; and
      (iii) determining whether a subset of the set of columns form a key for the right quantifier.

* * * * *